Jan. 29, 1935.   F. FISCHER   1,989,134
SHUTTER FOR REPRODUCING AND COPYING LENTICULATED FILMS
Filed March 22, 1932   2 Sheets-Sheet 1

Jan. 29, 1935.   F. FISCHER   1,989,134
SHUTTER FOR REPRODUCING AND COPYING LENTICULATED FILMS
Filed March 22, 1932    2 Sheets-Sheet 2

Patented Jan. 29, 1935

1,989,134

UNITED STATES PATENT OFFICE 1,989,134

SHUTTER FOR REPRODUCING AND COPYING LENTICULATED FILMS

Fritz Fischer, Berlin-Charlottenburg, Germany, assignor to Siemens & Halske, Aktiengesellschaft, Siemensstadt, near Berlin, Germany, a corporation of Germany Application March 22, 1932, Serial No. 600,393
In Germany March 24, 1931

7 Claims. (Cl. 88—24)

This invention relates to shutters used in reproducing and copying lenticulated films. The object of the present invention is the use of shutters, the gate of which is longitudinally inclined in the direction of the axis of the lenticulations. This offers the advantage that the interference phenomena occurring in the projecting and copying process owing to the lenticulations are avoided.

Figure 1:
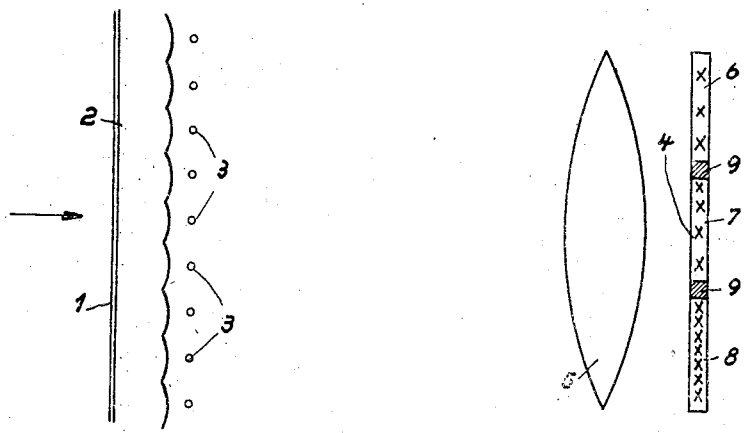
Figures 2, 3:
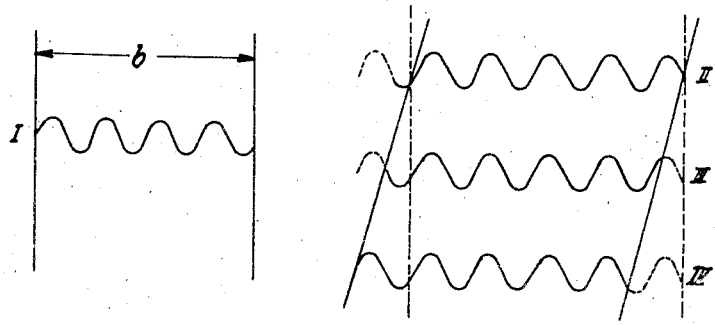
Figure 4:
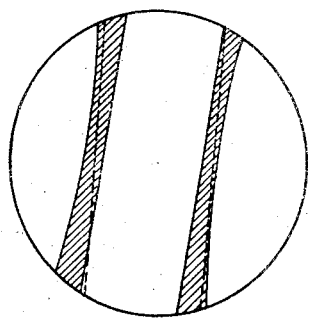
Figure 5:
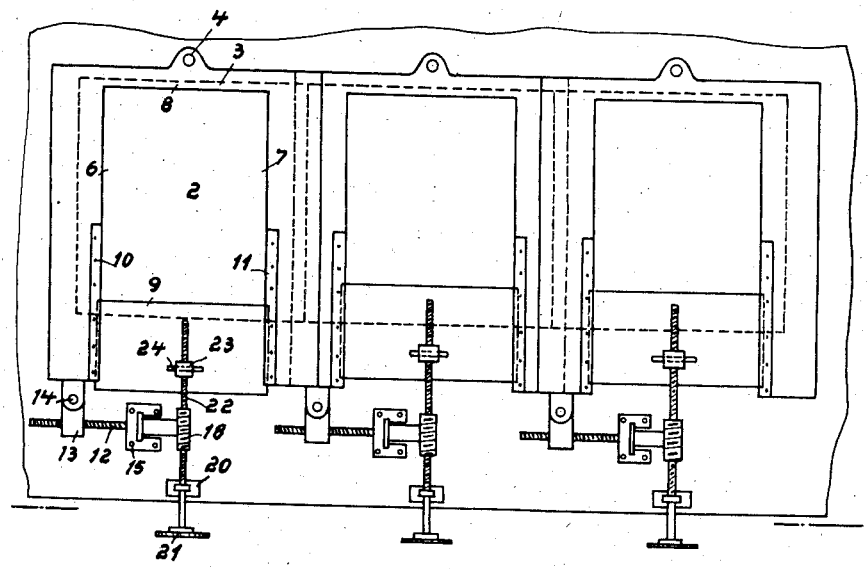
Figure 6:
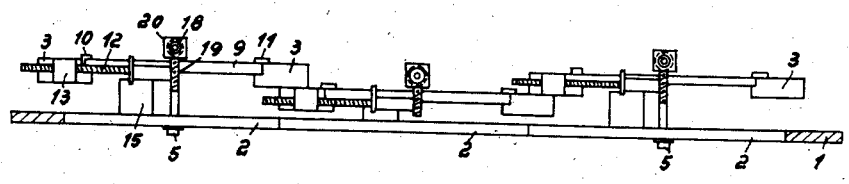

The object of the invention will be illustrated by means of the enclosed drawings. Fig. 1 shows the aspect of the diffraction phenomena. Figs. 2 and 3 show the distribution of the intensity maxima of these diffraction phenomena on the film strip. Fig. 4 shows how the shutters are placed directly upon the filter. Figs. 5 and 6 show a constructional example of the shutters.

In Fig. 1, 1 is the lenticulated film strip, drawn on a very enlarged scale, and provided with the emulsion 2. The film strip is exposed to light projected in the direction of the arrow and, assuming first that the light-source used for the projection is very restricted, the lenticular elements project the luminous images 3 of the light-source in the shape of points or lines. These luminous points or lines emit coherent light, so as to produce interference phenomena in the colour-filter 4. Let us assume the lens 5 to be the objective or that part of the objective which is placed between film and shutter. The interference phenomena on the filter will be most pronounced, if the filter lies in the focussing plane of the objective or the objective part 5.

Assuming that the selective colour-filter consists of three zones 6, 7 and 8 separated from one another by the impermeable parts 9, that the zone 6 is permeable for the light of longer waves and the zone 8 for the light of shorter waves, i. e. for instance the zones 6, 7 and 8 allow the red, green and blue light respectively to pass, only the light of this wavelength need be considered for each zone. Thus there may occur at the points of the filter designated by crosses, the main maxima formed by the light of the relative wave-length. It will be noted at once that the long-wave light produces less light maxima than does the short-wave light. Since, with the usual films and projecting objectives, about 3 to 10 such light maxima are formed in a zonewidth, it is very noticeable how the limits of the zone are situated with respect to the interference curve, if, for instance, a maximum lying at the edge of the zone falls still in the permeable or already in the impermeable part of the filter.

Since the colour-filter zones can, practically, allow many different wavelengths to pass, the maxima of which are displaced with respect to one another and since therefore the zone-limits act differently on the brightness of the portions of different wave-length, we have the same effect as if the colour of the illuminating light were changed. The projection for demonstration purposes results therefore in variations in colour. In the projection copy of takes, which are made on lenticulated films also, similar phenomena are noticed, more particularly if the emulsion of the unexposed film is not panchromatic and the copying light-source has no uniform spectral density, as is always the case in practice.

These phenomena are, in the first place, always noticeable by variations in the exposure and gamma, so that the density values in the layer parts behind the lenses corresponding to the filter-zones become incorrect.

In order to compensate for the colour incorrectness use should be made of suitable shutters placed on the colour-filter. The working of such shutters in the projection process is shown with the aid of Figs. 2 and 3. In Fig. 2 it is assumed that one zone of the filter has the width $b$. At I a curve has been plotted which represents the distribution of brightness over the width of this zone. It has been drawn for light of such wavelength that exactly a whole multiple of the maximum distance of the curve representing the light distribution occupies the width of the zone. Since now through this zone of the filter also light with greater or shorter wave-length is passing, shorter wave light gives, for instance, rise to intensity distributions, which are represented by the curve II of Fig. 3. This light thus produces in the zone of the colour-filter say five intensity maxima as contrasted with the light producing the brightness distribution, shown by curve I. Hence we have the phenomenon that, if the wave-length is shortened, the intensity of the light passed through the zone, experiences a strong, almost sudden increase in the wave-length range in which the fifth maximum lies in the permeable part of the filter and, that the amount of the passed light decreases again, if, for a further shortening of the wave-length, the next minimum is also included in the permeable part.

A suitable averaging permits of avoiding this relative softening down in certain parts of the spectrum.

According to the invention, one possibility of obtaining it consists in placing the lateral limits of the colour-zones on the slant, as is shown schematically in the lower part of Fig. 3 for a wavelength maintained constant. While the distribution of the brightness in the filter is represented at the upper by curve II, curve III indicates the intensity distribution for a mean height of the filter and curve IV the relative brightness distribution for the lower end. The curves III and IV result from curve II by a parallel displacement in the vertical direction. If now the colour-zone is laterally limited slantwise, only four maxima pass through the center of the filter of this colour with an intermediate height, the total amount of the passing light corresponds, on an average to about 4.5 maxima. It is thus obtained through such a slant of the zones that the amount of light per unit area, for a definite wave-length passing through a filter-zone, is independent of the situation of the interference phenomenon and the width of the filter. This holds also good for wave-lengths which do not differ much from the one under consideration.

A filter manufactured on the basis of these considerations is for instance represented in Fig. 4. The filter in this instance becomes a shutter having black surfaces or partitions separating the individual colour-zones placed on the slant and, in case of need shaped as wedges. In order to obtain a uniform compensation, the angle of slope should be chosen so as to displace the lateral edges of the zone from the upper end to the lower end, by an entire multiple of the distance between two neighbouring maxima, as compared with the maxima lying on say straight lines whereby a mean wave-length passing through the zone must be taken as a basis. As mean wave-length one should be chosen which lies for instance in the neighbourhood of the centre of gravity of all the wave-lengths passing through the zone under consideration, so that the physiological colour impression of the wave-length range depends essentially on the light of this wave-length.

The object of the invention can be applied conveniently to such filter-zones as are limited by curved lines, as for instance the band-zones of the taking filter. In order to obtain also for these segment-shaped zones by means of averaging, a compensation of the colour-falsifications due to interference phenomena, the limit of the zone opposite to the curved limiting line should also be given the form of a suitable curved line.

According to the invention, for limiting the zone-height of the various filter-segments, use is made of shutters, which are adjustable separately for each colour-zone. In addition to the advantage that they are applicable to each film, they also permit of avoiding the colour-falsifications due to interference phenomena, by adjusting the zone-height. It is thereby necessary that the slantwise running edges limiting the zones laterally be produced by shutters, which are connected with jaws limiting the zone-height in such a manner that the lateral edge, from its upper to its lower end, is always displaced by an entire number of wave-lengths of the interference phenomena as compared with these.

In Figs. 5 and 6 such shutters are shown, 1 being a socket for the filter 2, which may, for instance be red, green and blue. In front of the filters, there are the shutters 3 which, by means of a pin 4 and the nut 5 are pivoted on the base-plate 1. The shutter edge 3 limits the different filter-zones by its lateral parts 6 and 7. At the upper part, these are limited, on the one hand, by part 8 and, on the other hand, by the adjustable shutters 9. The latter are fitted in guides 10 and 11 respectively, which are screwed on the lateral parts 6 and 7. The turn movement of the individual shutter frames 3 is achieved by means of a spindle 12 and a threading element 13 which is pivoted at 14, in order to balance the movement. The spindle 12 is secured in a bearing 15 from being displaced laterally and is driven by the button 21 pivoted at 20 through a worm 18 and tooth wheel 19. On the shaft 22 of the worm 18, there is cut in a thread which, by means of the threading part 23, displaces the shutters 9 with respect to the height. The threading element 23 is pivoted within a slot 24.

On turning the button 21, the shutter part 9 is displaced simultaneously according to the direction of rotation upwards or downwards, whereas the whole shutter frame 3 is turned about the shaft 4 with the aid of the spindle 12.

What I claim:

1. In a device for reproducing and copying lenticulated films, a source of light, a colour-filter and a shutter having a gate inclined longitudinally in the direction of the axis of the lenticulations, said shutter being adjustable separately for each zone with respect to the height of the filter-zones and said shutter being adjustable separately for each zone with respect to the width of the filter-zone.

2. In a device for reproducing and copying lenticulated films, a source of light and a shutter having a gate inclined longitudinally in the direction of the axis of the lenticulations, said shutter being adjustable separately for each zone with respect to the height of the filter-zones, said shutter being adjustable separately for each zone with respect to the width of the filter-zone, said displacements being coupled with one another.

3. In a device for reproducing and copying lenticulated films, a source of light, a colour-filter and a shutter having a gate inclined longitudinally in the direction of the axis of the lenticulations, said shutter, closely connected on the colour-filter, being limited by curved lines at the segment-shaped filter-zones.

4. In a device for projecting and copying films having thereon a multiplicity of parallel lenticulations and used with a color filter having a plurality of color zones parallel to said lenticulations, a shutter having openings therein corresponding in number to the number of zones in the color filter used with the films, said openings having boundaries which are generally parallel to each other but which are inclined slightly with respect to said lenticulations, said inclination being such that the openings transmit substantially entire multiples of interference maxima of the light passing through the openings.

5. In a device for projecting and copying films having thereon a multiplicity of parallel lenticulations and used with a color filter having a plurality of color zones parallel to said lenticulations, a shutter having openings therein corresponding in number to the number of zones in the color filter used with the films, said openings having boundaries which are generally parallel to each other but which are inclined slightly with respect to said lenticulations, said inclination being such that the openings transmit substantially entire multiples of interference maxima of the light passing through the openings, and means for varying the inclinations of said boundaries which respect to said lenticulations.

6. In a device for projecting and copying films having thereon a multiplicity of parallel lenticulations and used with a color filter having a plurality of color zones parallel to said lenticulations, a shutter having openings therein corresponding in number to the number of zones in the color filter used with the films, said openings having boundaries which are generally parallel to each other but which are inclined slightly with respect to said lenticulations, said inclination being such that the openings transmit substantially entire multiples of interference maxima of the light passing through the openings, and means for varying the lengths of said openings as measured lengthwise of said lenticulations.

7. In a device for projecting and copying films having thereon a multiplicity of parallel lenticulations and used with a color filter having a plurality of color zones parallel to said lenticulations, a shutter having openings therein corresponding in number to the number of zones in the color filter used with the films, said openings having boundaries which are generally parallel to each other but which are inclined slightly with respect to said lenticulations, said inclination being such that the openings transmit substantially entire multiples of interference maxima of the light passing through the openings, and means for varying the inclinations of said boundaries with respect to said lenticulations and for simultaneously varying the lengths of said openings as measured lengthwise of said lenticulations.

FRITZ FISCHER.